(12) United States Patent
Katzer et al.

(10) Patent No.: US 9,191,620 B1
(45) Date of Patent: Nov. 17, 2015

(54) VOICE CALL USING AUGMENTED REALITY

(71) Applicant: Sprint Communications Company L.P., Overland Park, KS (US)

(72) Inventors: Robin D. Katzer, Louisburg, KS (US); Hemant Tiwari, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 79 days.

(21) Appl. No.: 14/137,369

(22) Filed: Dec. 20, 2013

(51) Int. Cl.
*H04N 7/14* (2006.01)
*H04N 7/15* (2006.01)

(52) U.S. Cl.
CPC ................... *H04N 7/157* (2013.01)

(58) Field of Classification Search
CPC ................. H04M 11/00; H04N 7/14
USPC .............. 348/14.01, 14.02, 14.07; 379/93.17
See application file for complete search history.

(56) References Cited

U.S. PATENT DOCUMENTS

| | | | |
|---|---|---|---|
| 6,166,744 A | 12/2000 | Jaszlics et al. | |
| 6,937,255 B2 | 8/2005 | Fukuda et al. | |
| 7,391,424 B2 | 6/2008 | Lonsing | |
| 7,671,875 B2 | 3/2010 | Anabuki et al. | |
| 8,542,906 B1 | 9/2013 | Persson et al. | |
| 8,797,321 B1 | 8/2014 | Bertolami et al. | |
| 9,058,764 B1 | 6/2015 | Persson et al. | |
| 2002/0010734 A1 | 1/2002 | Ebersole et al. | |
| 2002/0075286 A1 | 6/2002 | Yonezawa et al. | |
| 2002/0149581 A1 | 10/2002 | Furlong et al. | |
| 2003/0080978 A1 | 5/2003 | Navab et al. | |
| 2005/0253870 A1 | 11/2005 | Kotake et al. | |
| 2006/0038833 A1 | 2/2006 | Mallinson et al. | |
| 2006/0071945 A1 | 4/2006 | Anabuki | |
| 2007/0008341 A1 | 1/2007 | Endo et al. | |
| 2007/0091125 A1 | 4/2007 | Takemoto et al. | |
| 2007/0242899 A1 | 10/2007 | Satoh et al. | |
| 2013/0088514 A1 | 4/2013 | Breuss-Schneeweis et al. | |
| 2013/0106910 A1 | 5/2013 | Sacco | |
| 2013/0141468 A1 | 6/2013 | Coon | |
| 2013/0258040 A1* | 10/2013 | Kaytaz et al. | 348/14.07 |
| 2014/0063063 A1 | 3/2014 | Scott et al. | |
| 2014/0164322 A1 | 6/2014 | Beaurepaire et al. | |

OTHER PUBLICATIONS

Notice of Allowance dated Feb. 5, 2015, U.S. Appl. No. 11/948,655, filed on Nov. 30, 2007.
FAIPP Pre-Interview Communication dated Apr. 23, 2015, U.S. Appl. No. 14/090,657, filed Nov. 26, 2013.

(Continued)

*Primary Examiner* — Olisa Anwah

(57) ABSTRACT

A communication device that promotes an augmented reality voice call is disclosed. The communication device comprises a processor, a memory, and an application stored in the memory that, when executed by the processor, identifies a calling party or called party of a voice call of the communication device, downloads an avatar, wherein the avatar is a graphical representation associated with the calling party or called party; the application creates an image combining the avatar and a graphical representation of a living environment selected by the user of the communication device, and presents the image on a display of the communication device during the voice call.

20 Claims, 8 Drawing Sheets

(56) References Cited

OTHER PUBLICATIONS

Persson, Carl J., et al., Patent Application entitled "Markers to Implement Augmented Reality," filed Nov. 30, 2007, U.S. Appl. No. 11/948,655.
Persson, Carl J., et al., Patent Application entitled "Augmented Reality Image Offset and Overlay," filed May 21, 2008, U.S. Appl. No. 12/124,826.
Bell, Timothy L., et al. Patent Application entitled "System and Method of Augmenting Reality," filed Nov. 26, 2013, U.S. Appl. No. 14/090,657.
Office Action dated Oct. 13, 2010, U.S. Appl. No. 11/948,655, filed Nov. 30, 2007.
Final Office Action dated Apr. 15, 2011, U.S. Appl. No. 11/948,655, filed Nov. 30, 2007.
Final Office Action dated Jun. 28, 2011, U.S. Appl. No. 11/948,655, filed Nov. 30, 2007.
Advisory Action dated Sep. 7, 2011, U.S. Appl. No. 11/948,655, filed Nov. 30, 2007.
Examiner's Answer dated Jan. 31, 2012, U.S. Appl. No. 11/948,655, filed Nov. 30, 2007.
Office Action dated Jul. 11, 2011, U.S. Appl. No. 12/124,826, filed May 21, 2008.
Final Office Action dated Nov. 8, 2011, U.S. Appl. No. 12/124,826, filed May 21, 2008.
Office Action dated Feb. 1, 2013, U.S. Appl. No. 12/124,826, filed May 21, 2008.
Notice of Allowance dated May 13, 2013, U.S. Appl. No. 12/124,826, filed May 21, 2008.
Decision on Appeal dated Nov. 25, 2014, U.S. Appl. No. 11/948,655, filed Nov. 30, 2007.
First Action Interview Office Action dated Jul. 23, 2015, U.S. Appl. No. 14/090,657, filed Nov. 26, 2013.

* cited by examiner

VOICE CALL USING AUGMENTED REALITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Voice call via a communication device allows users to engage with one another via a communication device using only voice so long as there is a signal from a network to allow for a voice call. Video call via a communication device allows users to engage with one another whilst seeing a live image of the other user. Video call via a communication device may be subject to certain limitations such as high bandwidth usage or the requirement that a Wi-Fi connection be present in order to make a video call.

SUMMARY

In an embodiment, a communication device that promotes an augmented reality voice call is disclosed. The communication device comprises a processor, a memory, and an application stored in the memory. When executed by the processor, the application identifies a calling party or called party of a voice call of the communication device, downloads an avatar, wherein the avatar is a graphical representation associated with the calling party or called party. The application also creates an image combining the avatar and a graphical representation of a living environment selected by a user of the communication device, and presents the image on a display of the communication device during the voice call.

In an embodiment, a method of voice communication using augmented reality is disclosed. The method comprises establishing a call to a contact via a communication device, wherein the contact is stored in a contacts list on the communication device. The method further comprises downloading an avatar, wherein the avatar is a graphical representation that is associated with the contact. The method also comprises analyzing a voice signal received from the contact. The method further comprises modifying the avatar to comprise a graphical representation of the mouth of the avatar speaking, based on analyzing the received voice signal, wherein the graphical representation of the mouth of the avatar is synchronized to the voice of the contact presented on the mobile communication device. The method further comprises presenting the modified avatar on a display of the communication device while presenting the voice of the contact through a speaker or earpiece of the communication device.

In an embodiment, a method of voice communication promoting augmented reality on a communication device is disclosed. The method comprises establishing a call with a party via the communication device. The method further comprises creating a first augmented reality image by: downloading an avatar, wherein the avatar is a graphical representation that is associated with the party, and combining the avatar and a first graphical representation of a first living environment. The method further comprises receiving a second augmented reality image of the user of the communication device in a second living environment from the party. The method further comprises presenting the first augmented reality image and the second augmented reality image on a display of the communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
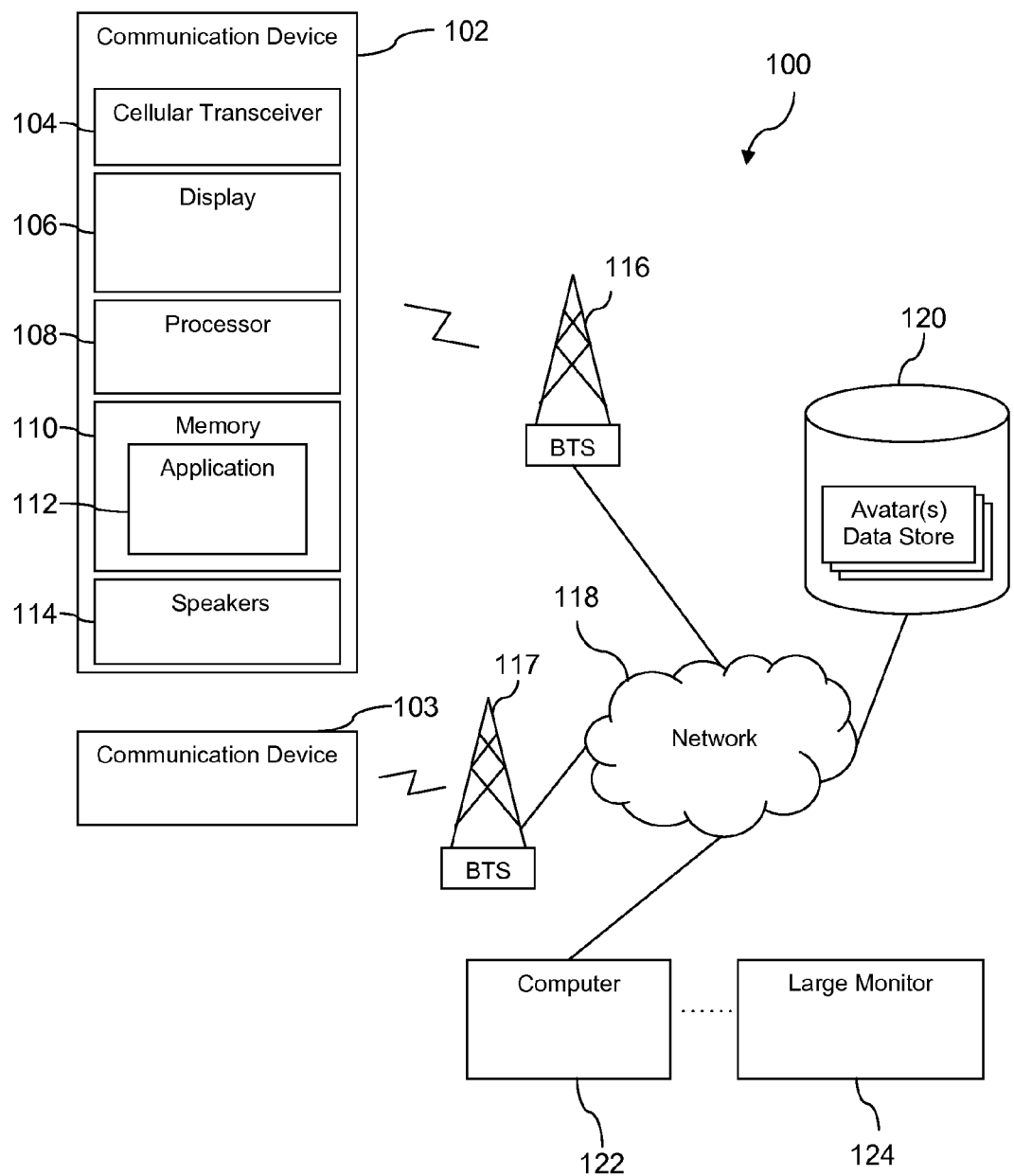
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote an augmented reality voice call. In an embodiment, a communication device identifies a calling party or called party of a voice call. In some contexts herein, the calling and/or called party may be referred to as the other party. The communication device downloads an avatar, wherein the avatar is a graphical representation associated with the other party. The communication device creates an augmented reality image combining the avatar and a graphical representation of a living environment, for example a living room, selected by a user of the communication device, and presents the augmented reality image on a display of the communication device during the voice call. The presentation of the augmented reality image may promote an increased sense of connectedness with the other party to the voice call.

In an embodiment, the communication device may download or access the avatar based on a link provided in an entry for the party in a contacts list stored by the communication device. In an embodiment, the communication device may access the avatar from a remote data store, for example the link in the entry for the party in the contacts list may provide a reference to a data store accessible via a communication network. In an embodiment, a previously downloaded avatar may be stored on the communication device, and the communication device may attempt to find the stored avatar before requesting the avatar from the remote data store. The communication device may analyze a voice signal received from the other party, and modify the avatar to represent a mouth of the avatar speaking in synchronization with the voice of the other party, based on analyzing the received voice signal. In an embodiment, the communication device may be communicatively coupled to a large monitor to allow viewing of the augmented reality voice call on a monitor.

In an embodiment, the communication device may create a first augmented reality image based on the avatar of the other party and a first living environment. The communication device may receive a second augmented reality image based on an avatar of the user of the communication device in a second living environment from the other party, for example, when the other party uses a device that also provides augmented reality voice call functionality. The communication device may present the first augmented reality image and the second augmented reality image on the display of the communication device. In an embodiment, the first augmented reality and the second augmented reality may be presented in split screen format.

The user may also interact with or customize the other party's avatar. These customization features may include outfitting the avatar with different clothing/accessories such as placing a hat on the head of the avatar, giving the avatar different physical features (different lengths of hair, different shades of hair, different shades of skin, different color eyes, etc.), or engaging in animations such as throwing a pie into the face of the avatar, etc. Such playful features may build user interest in the augmented reality functionality, for example among a youth segment of the customer base. The customization feature may add value to the augmented reality voice call functionality and boost sales of an application that provides the augmented reality voice call functionality and/or distinguish the wireless communication service provider's phone offerings over those of a competitor that does not provide similar augmented reality voice call functionality.

This disclosure teaches an augmented reality voice call system that promotes feeling increased rapport and/or connectedness with the other party during a voice call. At the same time, the system does not consume as much bandwidth as would a full on video call. With its customization features, the disclosed augmented reality voice call functionality may provide consumers an alternative to voice call, allowing for user interaction during the voice call.

Turning now to FIG. 1, a communication system 100 is described. In an embodiment, the system 100 comprises a communication device 102. In an embodiment, the communication device 102 may comprise a cellular transceiver 104, a display 106, a processor 108, a memory 110, and speakers 114. The memory 110 may further comprise an application 112 that promotes augmented reality voice calls. In an embodiment, the communication device 102 is one of a mobile phone, a personal digital assistant, or a media player. In an embodiment, the communication device 102 may be implemented as a handset. Details of handsets are discussed further hereinafter. In an embodiment, the communication device 102 may be a laptop computer, a tablet computer, or a notepad computer.

The system 100 may further comprise a second communication device 103. In an embodiment, the second communication device 103 may be substantially similar to the communication device 102. The system 100 may also comprise a base transceiver station (BTS) 116, a second base transceiver station 117 a network 118, a data store 120 that may comprise avatars, a computer 122, and a large monitor 124. In an embodiment, the base transceiver station 116 and the second base transceiver station 117 may provide a wireless communication link to the communication device 102 and the second communication device 103 to the network 118. In an embodiment, the base transceiver stations 116, 117 may provide a wireless communication link to the communication devices 102, 103 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While two communication devices 102, 103 and two base transceiver stations 116, 117 are illustrated in FIG. 1, it is understood that the system 100 may comprise any number of base transceiver stations 116, 117 or communication devices 102, 103. The network 118 may be a public communication network, a private communication network, or a combination thereof.

In an embodiment, the communication device 102 may be a glasses head unit, wherein the display 106 of the communication device 102 is a lens of the glasses or both lenses of the glasses, wherein the glasses head unit may be capable of analyzing an environment and may identify at least one standard object, wherein a standard object may be an electrical outlet, a book, a lamp, etc., and may determine a scale of the environment based on a known size of the at least one standard object. The glasses head unit may then scale the avatar into the environment as shown by the lens of the glasses head unit based on the scale of the environment. For further details on inferring environment scale and scaling an image to fit into an image of an environment, see U.S. patent application Ser. No. 14/090,657, filed Nov. 26, 2013, entitled "System and Method of Augmenting Reality," by Timothy L. Bell, et al., which is hereby incorporated by reference in its entirety. Alternatively, in an embodiment, the glasses head unit may take a picture of an environment, for example a living room in the house of a friend, a living room in the house of one's parents, or another location. When the user engages in a phone call in his or her own home with his or her friend, an image of the living room of the friend may be projected on the lens of the glasses and the avatar may be scaled and projected into the projected image of the living room of the friend on the lens of the glasses. In an embodiment, the avatar may be placed into a virtual image of an item of furniture, for example in a virtual image of a chair, and the avatar and virtual image of the item of furniture projected on the lens of the glasses.

In an embodiment, the application 112, when executed by the processor 108 of the communication device 102 identifies a calling party or called party of the communication device 102. Hereinafter the calling party or called party may be referred to as the other party. It is contemplated that the augmented reality voice call functionality disclosed herein may function substantially the same independently of whether the second communication device 103 originates the voice call to the communication device 102 or whether the communication device 102 originates the call to the second communication device 103.

In an embodiment, the communication device 102 may download an avatar from the avatar data store 120, wherein the avatar is a graphical representation associated with the other party. In an embodiment, the avatar is created using photographs of the other party. In an embodiment, the avatar may be based on a photograph or cartoon representation of the party. Alternatively, the avatar may not be a likeness of the party but may be selected as a favorite image to stand in for the party, for example an image selected from a pool of predefined and/or generic avatars, for example an avatar depicting superman, a public prosecutor on a popular serialized television show, a character from folklore, a historic figure, or other image. In an embodiment, the outside third party may be an image of an animal, an illustrated character, etc.

The application 112 creates an image combining the avatar and a graphical representation of a living environment for example a living room of a house. This image combining the avatar and the graphical representation of the living environment may be referred to as an augmented reality image. The user may select the living environment of the mobile communication device 102 from a plurality of available living environments. In an embodiment, a graphical representation of a living environment may be created using photographs or pictures of living environments. Examples of living environments may include: a living room of a house, a kitchen of a house, an empty warehouse, a stadium playing host to a sporting event, a scenic environmental view, etc.

The user may select different living environments for different calls from the same other party. For example, when the user receives a call from his mother while at work, he may select the living environment to be a conference room of his office, and the augmented reality image may depict the avatar of his mother sitting in a chair in the familiar conference room. Alternatively, when the user receives a call from his mother while watching television at home, he may select the living environment to be his living room, and the augmented reality image may depict the avatar of his mother sitting in a chair in his living room. In an embodiment, the application 112 may present the augmented reality image on the display 106 of the communication device 102 while presenting the voice of the contact through the speakers 114 or an earpiece of the communication device 102.

In an embodiment, the application 112 may cause the augmented reality image to be presented on a display of a computer 122 or a large monitor 124 that is communicatively coupled with the communication device 102 to allow for viewing of the augmented reality image on the monitor 124. In an embodiment, the application 112 further provides an interface for customizing the avatar by the user. These customizations may include outfitting the avatar with particular clothing (hats, shirts, jackets, pants, accessories, etc.). In an embodiment, the application 112 provides a user interface that enables the user of the communication device 102 to select the placement of the avatar within the living environment.

In an embodiment, the communication device 102 may receive a second augmented reality image from the other party, for example the second augmented reality image comprising an avatar associated with the user of the communication device 102 depicted in a living environment selected by the other party. The application 112 may cause the first augmented reality image and the second augmented reality image to be presented on the display 106 of the communication device 102. In an embodiment, the first augmented reality image and the second augmented reality image may be presented in split screen format. Split screen may involve a visible division of the screen, usually two divisions, but there may be more divisions. In an embodiment, when the display presents the call in split screen format, the user may be able to see how other the other party has positioned his or her avatar in the living environment selected by the other party. Likewise, if the other party has customized the second augmented reality image with hats or clothes or has provided an animation, the user of the communication device 102 can see this on the display 106. In an embodiment, customizations might include putting the avatar into a different outfit, accessorizing the avatar to have a watch or jewelry, giving the avatar different hair or eye color, increasing or decreasing the size of the avatar, etc. In an embodiment, when the display is in split screen format, the users may be able to see the avatars in the living environments, as chosen by other users. In an embodiment, the split screen format may be presented on the large monitor 124, a laptop computer, or another means that is communicatively coupled with the communication devices 102 and/or 103 for displaying the augmented reality voice call.

In an embodiment, a user of the communication device 102 may be able to turn on and turn off the ability of the other party to see the modifications to the avatar or the positioning of the avatar of the other party. In an embodiment, whether the other party is able to see the modifications to the avatar or the positioning of the avatar may be determined by privacy settings configured on the communication device 102. For example, privacy settings configured for friends may enable sharing the modifications and/or customizations with the other party when the other party is a friend while privacy settings configured for non-friend co-workers or bosses may disable sharing the modifications and/or customizations with the other party. In an embodiment, a user may share different avatars of himself or herself with others selectively. For example, a girl may share a first avatar of herself with her boyfriend and may share a second, different avatar of herself with her boss. For example, a man may share a first avatar of himself with his fishing buddies and may share a second, different avatar of himself with his church minister.

Figure 2:
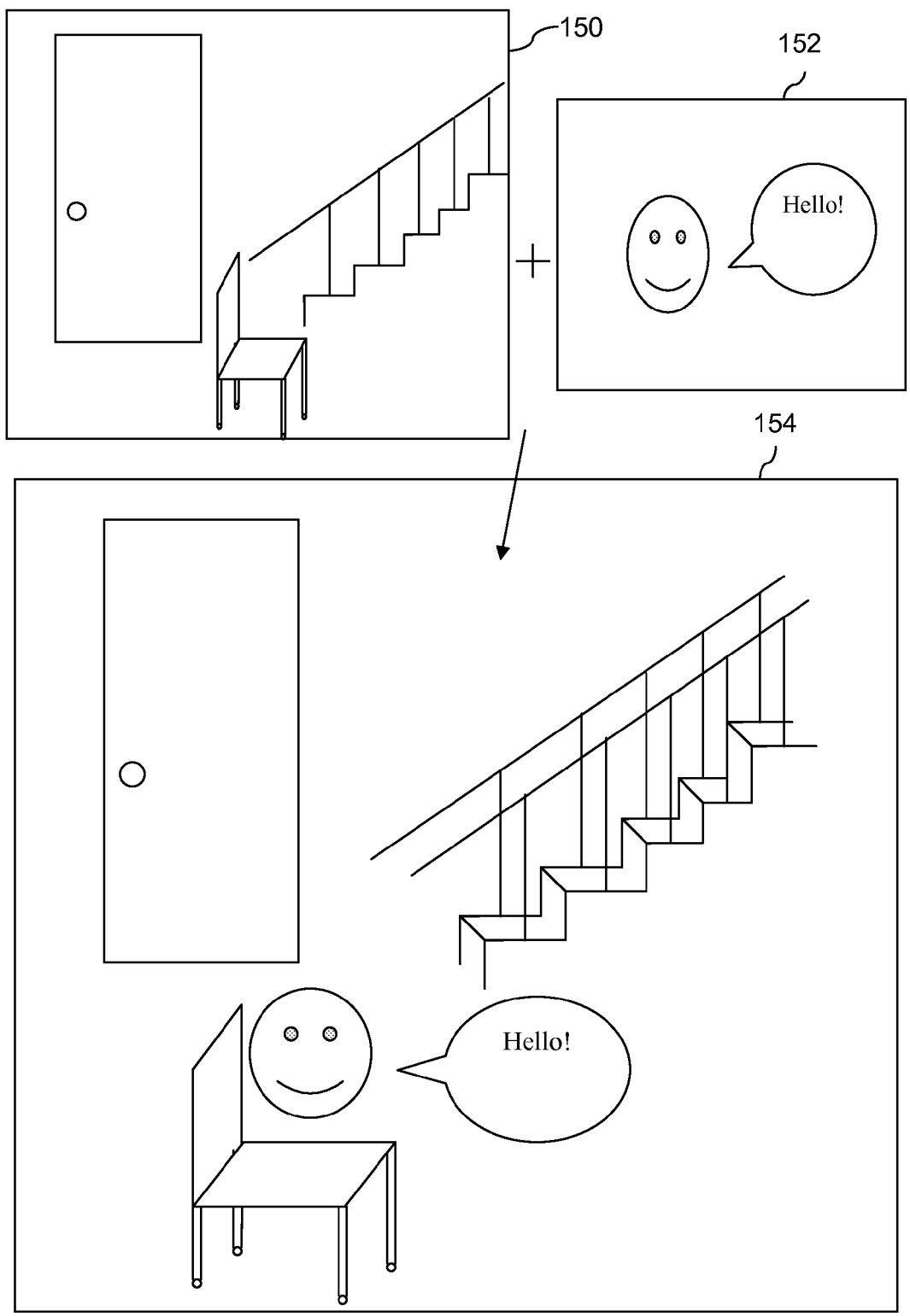
FIG. 2 is an illustration of an augmented reality image according to an embodiment of the disclosure.

In FIG. 2, a representation of an augmented reality image 154 is described. A living environment 150 is selected by the user of the communication device 102, an avatar 152 that is selected by and/or customized by the user of the communication device 102 is identified, and an augmented reality image 154 which combines both the living environment 150 and the avatar 152 is created by the application 112. In an embodiment, the living environment 150 is displayed as a living room of a house. In an embodiment, the application 112 further provides an interface that enables the user to select the placement of the avatar 152 in the living environment 150 within the augmented reality image 154; for example, the avatar 152 is positioned on a chair within the living environment 150.

Figure 3:
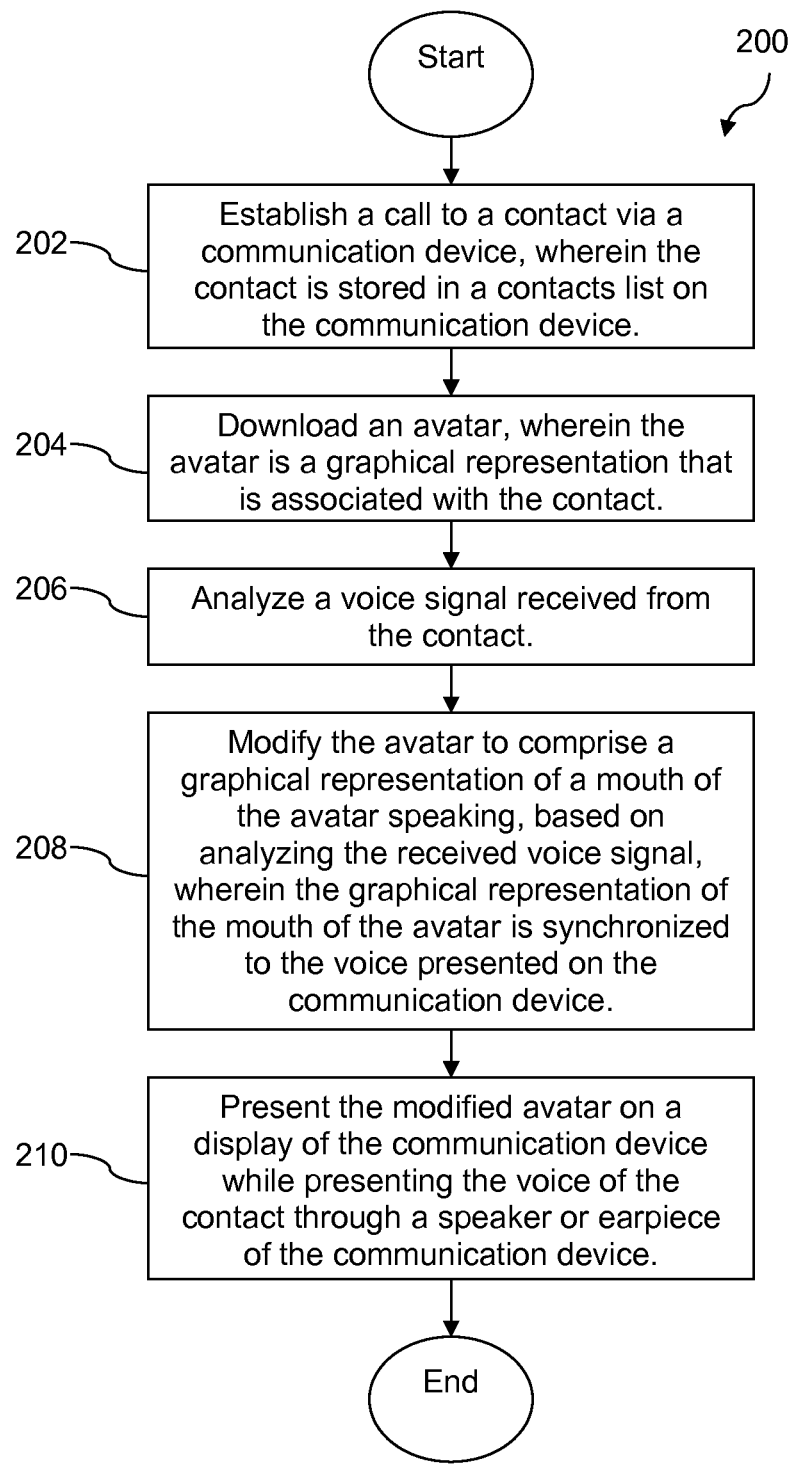
FIG. 3 is a flow chart of a method according to an embodiment of the disclosure.

In FIG. 3, a method 200 is described. At block 202, a call is established via an application 112 of a communication device 102, wherein the contact is stored in a contacts list on the communication device 102. The call may be initiated by the communication device 102 or the call may be initiated by the second communication device 103 and may be directed to and/or terminate at the communication device 102. In an embodiment, the contact includes a phone number associated with the other party. At block 204, the application 112 via the communication device 102 downloads an avatar, wherein the avatar is a graphical representation that is associated with the other party. In an embodiment, the application 112 may check local memory for a cached avatar of the other party first. At block 206, the communication device 102 analyzes a voice signal received from the party. At block 208, the application 112 via the communication device 102 modifies the avatar to comprise a graphical representation of a mouth of the avatar speaking, based on analyzing the received voice signal, wherein the graphical representation of the mouth of the avatar is synchronized to the voice presented on the communication device 102.

In an embodiment, the call may be delayed by the analysis that supports the lip synchronization of the avatar with the voice signal of the party. For example, if the analysis and generation of a lip synchronization image consume 0.2 seconds, the voice of the other party may be delayed 0.2 seconds before the voice signal is transmitted to the speaker 114 of the communication device 102. At block 210, the communication device 102 presents the modified avatar on a display while presenting the voice of the party through a speaker 114 or earpiece of the communication device 102. In an embodiment, the augmented reality image may be displayed on one of a large monitor, a laptop computer, or another communication device. In an embodiment, the speaker or earpiece may be communicatively coupled to a monitor, a computer or another communication device. In an embodiment, the call may be a voice over internet protocol (VoIP) call.

Figure 4:
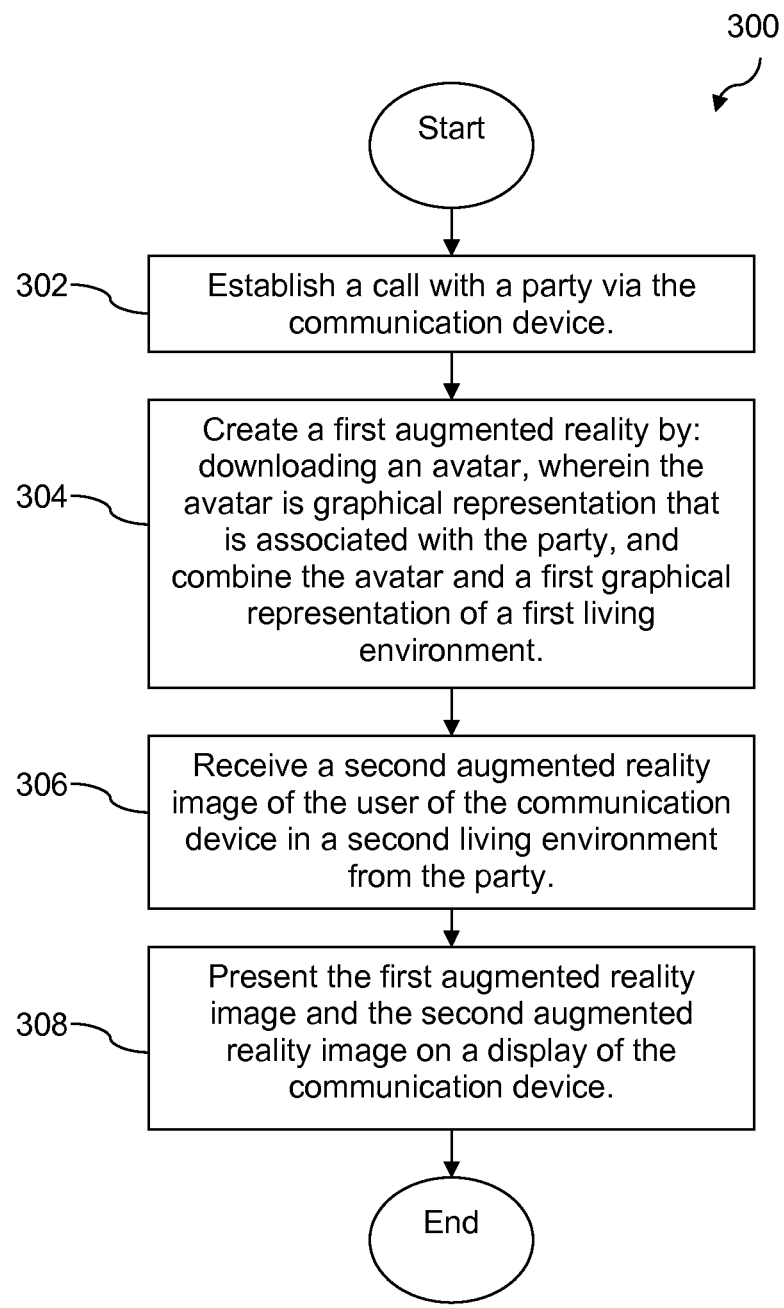
FIG. 4 is a flow chart of another method according to an embodiment of the disclosure.

In FIG. 4, a method 300 is described. At block 302, a call is established with the party via a communication device 102. At block 304, the communication device 102 creates a first augmented reality image via an application 112 by: downloading an avatar, wherein the avatar is a graphical representation that is associated with the contact which is further associated with the party of the voice call, and combines the avatar and a first graphical representation of a first living environment. At block 306, the communication device receives 102 a second augmented reality image of the user of the second communication device 103 in a second living environment from the party. At block 308, the communication device 102 presents the first augmented reality image and the second augmented reality image on a display. In an embodiment, the display of the first augmented reality image and the second augmented reality image may be in split screen format. Split screen may involve a visible division of the screen, usually two, but there may be more divisions. In an embodiment, when the display presents the call in split screen format, the users may be able to see how other users are positioning and animating their avatars. In an embodiment, animations might include putting the avatar into a different outfit, accessorizing the avatar to have a watch or jewelry, giving the avatar different hair or eye color, increasing or decreasing the size of the avatar, etc. In an embodiment, when the display is in split screen format, the users may be able to see the avatars in the living environments, as chosen by other users. In an embodiment, the split screen format may be presented on a large monitor, a laptop computer, or another means that is communicatively coupled with the mobile communication device for displaying the augmented reality voice call.

Figure 5:
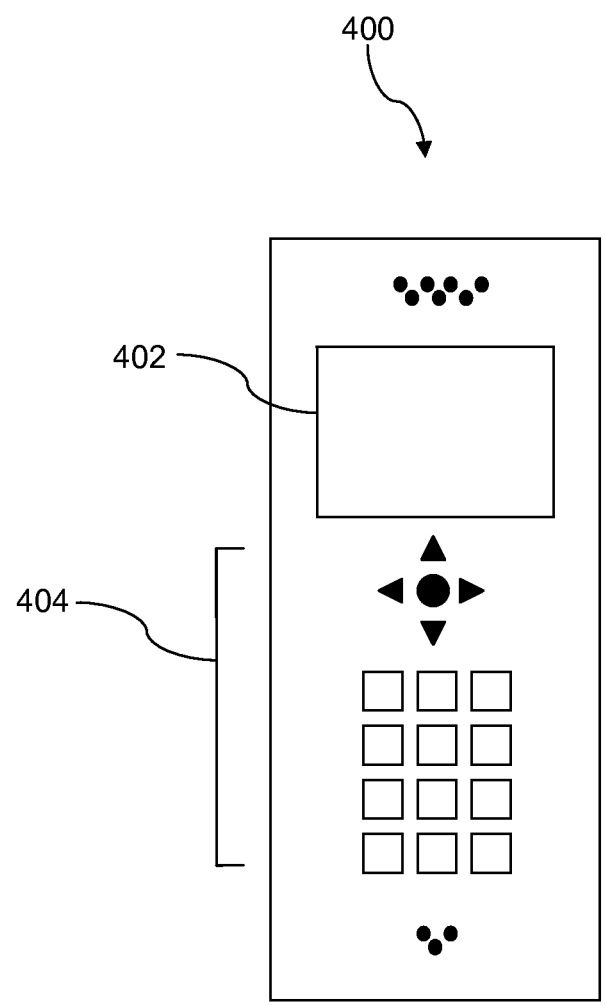
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
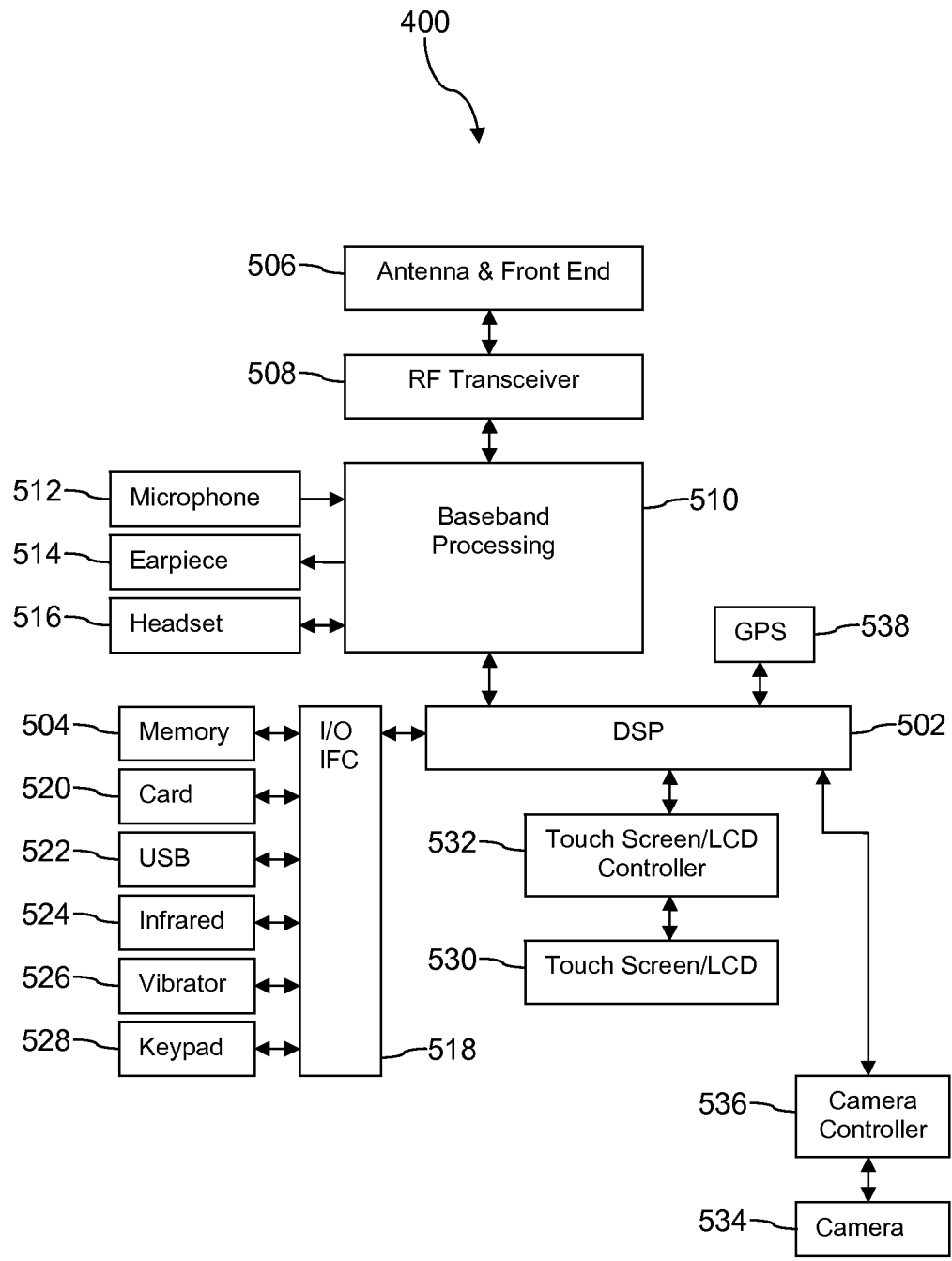
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
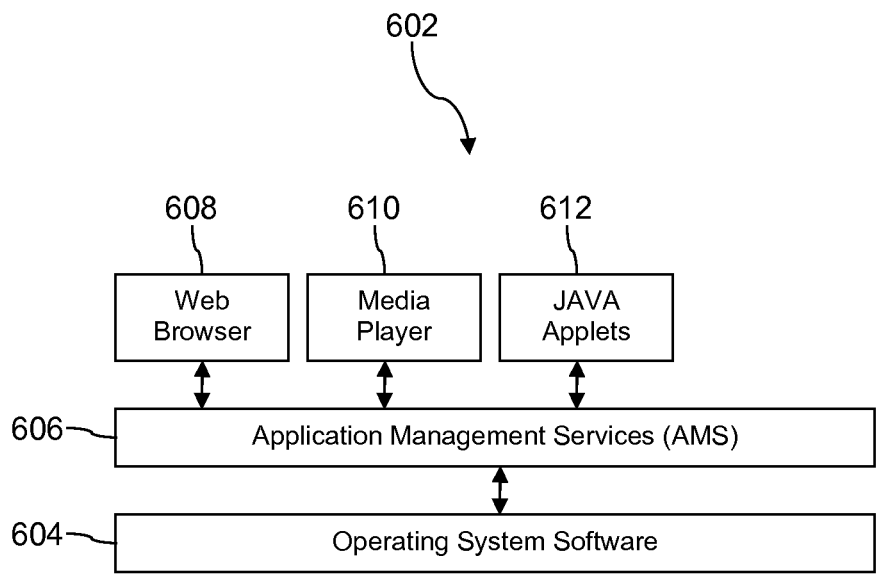
FIGS. 7A and 7B are block diagrams of software architecture for a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
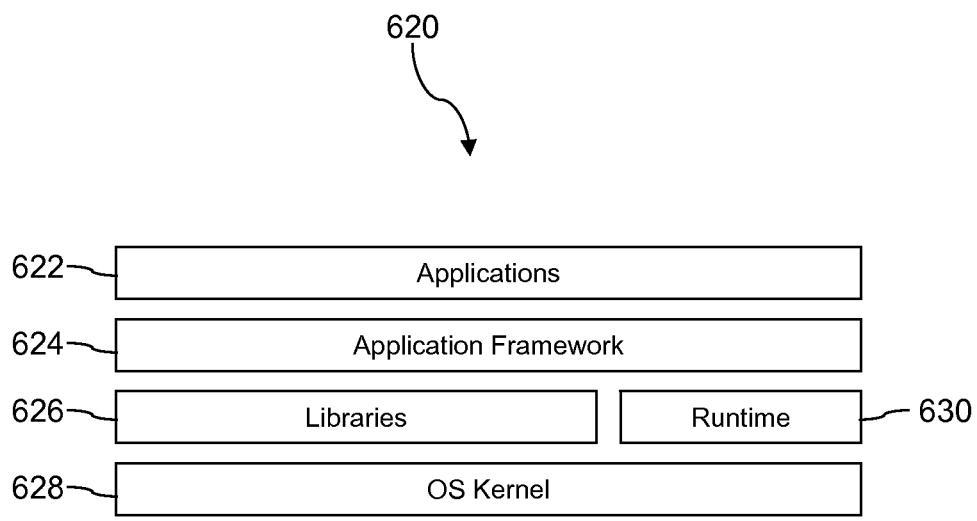

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
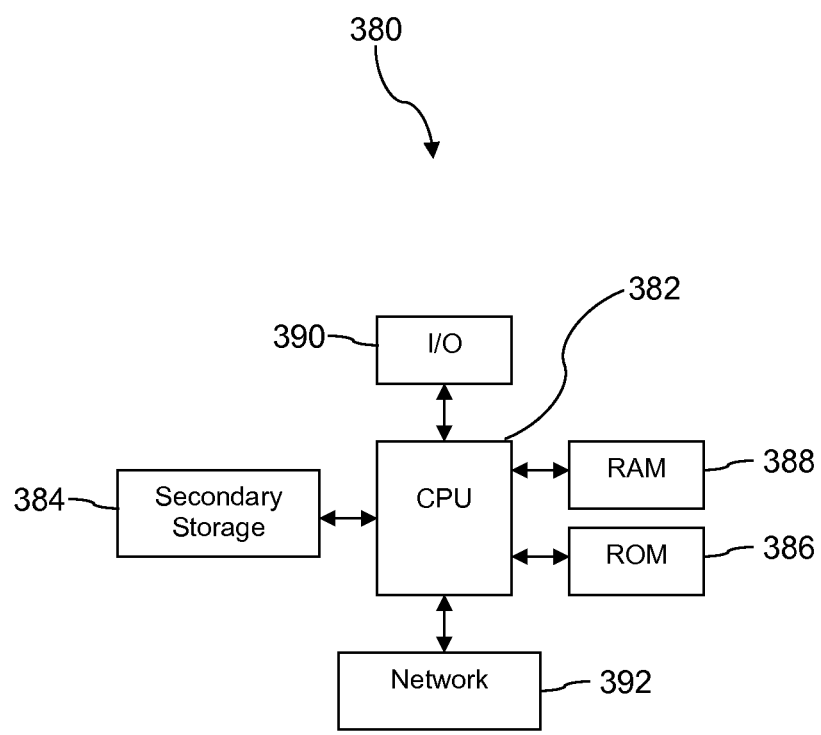
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present.

Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication device that promotes an augmented reality voice call, comprising;
   a processor,
   a memory, and
   an application stored in the memory that, when executed by the processor,
      identifies a calling party or called party of a voice call of the communication device,
      downloads an avatar, wherein the avatar is a graphical representation associated with the calling party or called party, and
      creates an image combining the avatar and a graphical representation of a living environment selected by a user of the communication device, and
      presents the image on a display of the communication device during the voice call.

2. The method of claim 1, wherein the avatar is created using photographs of the calling party, called party, or an outside third party.

3. The method of claim 2, wherein the avatar is stored in a cloud data store.

4. The method of claim 2, wherein the application further provides an interface for customizing the avatar by the user.

5. The method of claim 1, wherein the graphical representation of the living environment is created based on photographs of a room.

6. The method of claim 1, wherein the avatar may be positioned into particular places in the graphical representation of the living environment as chosen by the user.

7. A method of voice communication using augmented reality, comprising:
- establishing a call to a contact via a communication device, wherein the contact is stored in a contacts list on the communication device;
- downloading an avatar, wherein the avatar is a graphical representation that is associated with the contact,
- analyzing a voice signal received from the contact;
- modifying the avatar to comprise a graphical representation of a mouth of the avatar speaking, based on analyzing the received voice signal, wherein the graphical representation of the mouth of the avatar is synchronized to the voice of the contact presented on the communication device; and
- presenting the modified avatar on a display of the communication device while presenting the voice of the contact through a speaker or earpiece of the communication device.

8. The method of claim 7, wherein the call is delayed to allow for lip synchronization of the avatar with the voice signal of the contact.

9. The method of claim 7, wherein the application is displayed on one of a large monitor, a laptop computer, or a communication device.

10. The method of claim 7, wherein the call may be a voice over internet protocol call.

11. The method of claim 7, wherein the communication device is a glasses head unit, wherein the display of the communication device is the lens of the glasses, wherein the glasses head unit is capable of analyzing an environment and identifying at least one standard object, wherein a standard object comprises one of an electrical outlet, a book, or a lamp, further comprising
- determining a scale of the environment based on a known size of the at least one standard object and
- scaling the avatar into the environment as shown by the lens of the glasses head unit based on the scale of the environment.

12. The method of claim 7, wherein the communication device is configured to communicate using a radio transceiver according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless protocol.

13. The method of claim 7, wherein the speaker or earpiece may be connected to a monitor, a computer, or a mobile communication device.

14. A method of voice communication promoting augmented reality on a communication device, comprising:
- establishing a call with a party via the communication device,
- creating a first augmented reality image by
  - downloading an avatar, wherein the avatar is a graphical representation that is associated with the party and
  - combining the avatar and a first graphical representation of a first living environment,
- receiving a second augmented reality image of the user of the communication device in a second living environment from the party, and
- presenting the first augmented reality image and the second augmented reality image on a display of the communication device.

15. The method of claim 14, wherein the graphical representation of the living environment is created based on photographs which are transmitted to the application.

16. The method of claim 14, wherein the application further provides an interface for customizing the avatar by the user.

17. The method of claim 14, wherein the display of the first and second augmented reality images are in split screen format.

18. The method of claim 17, wherein with the display in split screen format, the users are able to see how other users are positioning and animating their avatars.

19. The method of claim 17, wherein with the display in split screen format, the users are able to see the avatars living environments, as chosen by other users.

20. The method of claim 14, wherein split screen format may be displayed on a monitor, a laptop, or another means for displaying the augmented reality.

* * * * *